United States Patent [19]

Verthe et al.

[11] Patent Number: 5,718,781
[45] Date of Patent: Feb. 17, 1998

[54] TIRE HAVING SILICA REINFORCED RUBBER TREAD CONTAINING CARBON FIBERS

[75] Inventors: John Joseph Andre Verthe, Kent; Joseph Kevin Hubbell, Akron; Gregory Martin Holtzapple, Kent, all of Ohio

[73] Assignee: The Goodyear Tire & Rubber Company, Akron, Ohio

[21] Appl. No.: 479,983

[22] Filed: Jun. 7, 1995

[51] Int. Cl.⁶ .......................... B60C 11/00; B60C 19/08
[52] U.S. Cl. ........................... 152/209 R; 152/152.1; 152/DIG. 2
[58] Field of Search ................ 152/209 R, 209 D, 152/151, 152.1, DIG. 2; 524/492, 493

[56] References Cited

U.S. PATENT DOCUMENTS

| | | | |
|---|---|---|---|
| 2,339,546 | 1/1944 | Hanson | 152/DIG. 2 |
| 3,768,537 | 10/1973 | Hess et al. | 152/209 R |
| 5,225,011 | 7/1993 | Takino et al. | 152/209 R |
| 5,336,730 | 8/1994 | Sandstrom et al. | 152/209 R |
| 5,518,055 | 5/1996 | Teeple et al. | 152/209 R |

FOREIGN PATENT DOCUMENTS

| | | | |
|---|---|---|---|
| 793507 | 1/1936 | France | 152/151 |
| 119409 | 6/1986 | Japan | 152/209 R |
| 191204 | 8/1987 | Japan | 152/209 R |
| 7602 | 1/1991 | Japan | 152/209 R |
| 65406 | 3/1991 | Japan | 152/209 R |
| 74202 | 3/1991 | Japan | 152/152.1 |
| 597008 | 3/1978 | Switzerland | 152/152.1 |

*Primary Examiner*—Steven D. Maki
*Attorney, Agent, or Firm*—Henry C. young jr

[57] ABSTRACT

The invention relates to a rubber tire composed of carbon black reinforced rubber carcass and having a rubber tread which is quantitatively reinforced with silica and contains a minor amount of carbon black reinforcement and/or carbon fibers. When said tread contains silica and carbon black reinforcement exclusive of carbon fibers, the said tread has a thin rubber layer over at least a portion of the outer surface tread intended to be ground-contacting wherein said rubber layer contains a combination of silica and/or carbon black reinforcement and carbon fibers. In one aspect, such alternative outer rubber layer (a) extends across at least a portion of the outer surface of the tread intended to be ground contacting and (b) contacts at least one other carbon black reinforced rubber component of the tire to provide a path of relatively low electrical resistance from said quantitatively silica reinforced tread to the bead portion of the tire carcass.

1 Claim, No Drawings

TIRE HAVING SILICA REINFORCED RUBBER TREAD CONTAINING CARBON FIBERS

FIELD

This invention relates to a rubber tire composed of carbon black reinforced rubber carcass and having a rubber tread which is quantitatively reinforced with silica and contains a minor amount of carbon black reinforcement and carbon fibers.

When the basic tire tread contains silica and carbon black reinforcement exclusive of carbon fibers, the said basic tread has a thin rubber layer over at least a portion of the outer surface of the tread intended to be ground contacting wherein said rubber layer contains a combination of silica and/or carbon black reinforcement and carbon fibers.

In one aspect, such alternative outer rubber layer (a) extends across at least a portion of the outer surface of the tread intended to be ground-contacting and (b) contacts at least one other carbon black reinforced rubber component of the tire to provide a path of relatively low electrical resistance from said quantitatively silica reinforced tread to the bead portion of the tire carcass.

BACKGROUND

Pneumatic rubber tires are conventionally prepared with a rubber tread which can be a blend of various rubbers which are, typically, sulfur curable or sulfur cured as the case may be, diene based elastomers. The tire rubber, including its tread portion, is typically reinforced with carbon black.

For the purposes of this presentation, a tire is viewed as being composed of a circumferential tread and supporting carcass therefor. The carcass is viewed as being composed of relatively conventional elements which include but are not limited to carbon black reinforced rubber sidewalls (although a portion of an outer surface of the sidewalls may be colored by an appropriate pigment such as white titanium dioxide and, thus, not contain carbon black), beads, innerliner and the supporting carcass plies, including fabric reinforced plies. A shoulder region of a tire is considered as being a portion of the tire where the tread begins to contour and meets the sidewall. It is not normally a sharp line of demarkation and its actual position may vary somewhat from tire to tire. The bead portion of the carcass is typically composed of a relatively inextensible bundle of wires which is encased in carbon black reinforced rubber and is designed to contact a metal rim on which the tire itself is mounted to form a tire/rim assembly which itself conventionally adapted to be mounted on a vehicle, particularly a wheel of a vehicle. The rim is typically steel or aluminum and is, thus, electrically conductive since the metal is considered as having a very low resistance to flow of electricity. The term "metal", as used herein for the metal rim, is intended to mean "electrically conductive metals such as, for example, the aforesaid steel and aluminum rims" as would be understood by those having skill in such art.

It is acknowledged that, in some tire constructions, carbon black reinforced rubber components such as, for example, components which are sometimes known as chippers and chafers may be positioned in the bead area or region of the tire construction to assist in cushioning the bead component against the metal rim. In the context of this description, a reference to the aforesaid bead component of the tire carcass is intended to include such other associated rubber components unless otherwise indicated, and thereby are a part of the tire carcass.

In practice as is well known to those having skill in such art, the tire, which may sometimes be referred to as a pneumatic tire, is mounted on the metal rim and air pressure is applied to the cavity enveloped by the metal rim and the pneumatic tire carcass.

The hereinbefore construction elements, or components, of a pneumatic tire and tire carcass, as well as such tire/rim assembly, are also well known to those familiar with such tire art.

It is important to appreciate that rubber by itself is generally considered as being, substantially, an electrical insulator or, in other words, a rather poor conductor of electricity.

A carbon black reinforced rubber vehicular tire, while still providing a degree of resistance to flow of electricity, has a considerably higher electrical conductivity, or lower resistance to flow of electricity, than rubber without the carbon black reinforcement.

It is considered herein that a continuous relatively low electrical resistance path is created between the electrically conductive metal rim of a tire/wheel (tire/rim) assembly to the outer tire tread surface, and thence to the ground via the carbon black reinforced rubber of the tire, including its ground-contacting tread component, for such a tire/rim assembly mounted on a vehicle which is intended to travel over the ground.

In this manner, it is considered herein that potential electrical energy, which may be created by components of or within a moving vehicle as its rotating wheels and associated tire/rim assemblies as they travel over the ground, is dissipated from the rim of a tire/rim assembly on the vehicle to the ground via the carbon black reinforced rubber path of the tire carcass and tread.

Thus, in one aspect, it is considered herein that the carbon black reinforced rubber of the tire carcass and associated tread normally provide a sufficiently low electrical resistance path to dissipate potential electrical energy and, thereby, retard or eliminate static electrical charge from building up and/or accumulating under dynamic conditions of a rotating tire on a vehicle traveling across the ground.

Alternatively, in practice, carbon black reinforced rubber tires may sometimes be prepared which have outer rubber treads designed to be ground-contacting which are quantitatively reinforced with silica and, thus, contain only minimal amounts, such as for example, 10 phr or less of carbon black.

In such silica reinforced tire tread construction, although the various other rubber components of the tire, namely, the aforesaid overall tire carcass, are quantitatively reinforced with carbon black with a minimal amount, if any, of silica and, thus, have a relatively low electrical resistance whereas the silica reinforced tread itself has a substantially high electrical resistance and, thus, such tread creates a degree of electrical insulating effect between the tire carcass and ground. Such a tire construction has a substantially less tendency to dissipate static electricity from the tire to the ground, and particularly from the metal rim of a tire/rim assembly to the outer surface of the tire tread and thence to the ground, which may be generated by a dynamic condition of the rotation of the tire on a moving vehicle. Accordingly, a potential for static electricity to build-up, or increase, is considered to be higher for such a tire construction than for a similar tire with a carbon black reinforced tread.

Therefore, it is desirable to provide a suitable path for relatively low electrical resistance for such a tire having a quantitative silica reinforced rubber tread and minimal, if any, carbon black reinforcement.

While the dissipation of generated electrical energy may not be completely understood, it is believed that, insofar as a vehicular tire is concerned, electricity may be transmitted primarily from the metal, or steel, rim, thence on or through the carbon black reinforced rubber surface of the tire carcass to the outer surface of a carbon black reinforced rubber tread and thence to the ground.

However, it is recognized that a thin outer rubber coating, if applied to a tire tread surface, will relatively quickly wear away as the tire is used, leaving the coating on surfaces within the grooves in a tire tread which typically has a lug/groove design or configuration. Thereby, it is considered herein that only a very small portion of the coating cross-section on the walls of the tire tread grooves is actually available to be directly presented to, or contact, the ground to facilitate a relatively low electrical resistance from the tire to the ground for a tire with tread which is quantitatively reinforced with silica.

In one alternative aspect, for a tire tread conventionally configured with a combination of lugs and grooves, it is desired that the grooves communicate with the carbon black reinforced rubber shoulder of the tire which includes the area of the tire where the sidewall and tread meet, in order for the carbon black/carbon fiber reinforced outer cap to more fully contact the carbon black reinforced rubber portion of the tire, namely, the tire carcass and including the tread base in the case of a tread cap/base construction.

As used herein, the terms "quantitatively reinforced with silica", "quantitative silica reinforced rubber" and the like used in conjunction with a tire tread, and with a rubber tire tread cap, in a tread cap/base construction, which contains about 35 to about 90, sometimes preferably about 50 to about 90 phr, of silica, and which may also optionally contain carbon black in which the carbon black is present in not more than about 25 percent of the total of the silica and carbon black.

The term "phr" as used herein, and according to conventional practice, refers to "parts of a respective material per 100 parts by weight of rubber". In the description herein, rubber and elastomer are used interchangeably.

The term "carbon black" as used herein refers to "carbon black reinforcement for elastomers, particularly sulfur cured elastomers" and are well known to those skilled in the rubber compounding art. Such carbon black is conventionally in a form of particles having a particle size, for example, in a range of about 20 to about 40 nm in contrast to or exclusive of, carbon fibers or filaments, particularly discrete carbon fibers, unless otherwise defined.

In the description herein, the terms "vulcanized" or "vulcanizable" may, on occasion, be used interchangeably with the terms "cured" and "curable".

SUMMARY AND PRACTICE OF THE INVENTION

In accordance with this invention, a tire is provided having a tread which is comprised of at least one sulfur vulcanizable elastomer selected from conjugated diene homopolymers and copolymers and copolymers of conjugated diene and vinyl aromatic compound and reinforced with about 35 to about 100 phr of reinforcement composed of silica and, also, carbon black or carbon fibers, wherein (i) said reinforcement in said tread is composed of about 45 to about 90 phr of silica and about 5 to about 30, alternatively about 5 to about 15, phr of carbon fibers or (ii) said reinforcement in said tread is composed of about 35 to about 95 phr of silica and about 5 to about 20, alternatively about 5 to about 10, phr of carbon black in which later case said tread has a thin outer rubber layer over at least a portion of the outer surface of the tread intended to be ground contacting and extending to contact at least one carbon black reinforced component of said tire carcass and wherein said outer rubber layer contains about 40 to about 90 phr of reinforcement composed of about 25 to about 85 phr of silica reinforcement, about 3 to about 30, preferably about 5 to about 15, phr of carbon fibers and up to about 30, preferably about 5 to about 10, phr of carbon black; wherein the total of carbon fiber and carbon black is at least 35 phr wherein said carbon fibers have an average diameter of about 0.2 to about 10 microns and an aspect ratio of about 200 to about 2000 before mixing with the rubber.

In the practice of this invention, the carbon fibers are filaments typically having an aspect ratio in a range of about 500 to about 1000 before mixing with the rubber and upon mixing with the rubber composition under high shear conditions, it is understood that the carbon fibers break down to form fibers having an aspect ratio in a range of about 50 to about 100.

The inclusion of carbon fibers herein is intended to (i) aid or supplement electrical resistance enhancement (reduction) when used in combination with carbon black in a rubber composition, alternatively, (ii) reduce the amount of carbon black reinforcement utilized for electrical resistance enhancement (reduction) of a rubber composition, or (iii) replace, at least in some measure, carbon black in the rubber composition.

Whether the inclusion of the carbon fibers either supplements or aids carbon black or is even effective when used alone in a rubber composition in reducing electrical resistance for a rubber composition or actually reduces the amount of carbon black needed to reach an equivalent electrical resistance for a rubber composition will largely depend on the rubber composition itself, the level, type or amount of carbon black or carbon fibers contained in the rubber composition and nature or form of the intended use for the rubber composition. Thus, this invention contemplates the use of carbon fibers whether or not they effectively reduce the electrical resistance of the tire.

The outer rubber tread layer, if used, typically may have a thickness on the outer surface of the tread in a range of about 0.005 to about 0.08 cm.

In practice, a tire is provided composed of carcass components comprised of sulfur vulcanized carbon black reinforced elastomers together with an outer circumferential tread composed of said outer layer co-vulcanized with the tread.

In practice, a tire may be manufactured, for example, by the steps of (A) co-extruding a tire tread composite as a laminae of a silica reinforced sulfur vulcanizable rubber tread and, alternatively, a thin sulfur vulcanizable rubber outer layer, reinforced with a combination of carbon black and carbon fibers, and optionally silica, over at least a portion of the outer tread surface and (B) applying said tire tread composite onto a tire carcass of carbon black pigment reinforced rubber to form a tire assembly thereof; wherein said alternative thin outer rubber layer extends across the surface of said tread cap portion and connects with, or otherwise contacts, at least a portion of at least one other carbon black reinforced rubber component of the tire.

The resultant tire assembly is shaped and sulfur cured in a suitable mold to form a vulcanized tire.

While not limited thereto, various sulfur vulcanizable elastomers and combinations thereof may be used in the construction of various elements of the tire.

Elastomers contemplated and homopolymers and copolymers of conjugated diene hydrocarbons and copolymers of conjugated dienes and aromatic vinyl compounds such as, for example, styrene and alphamethylstyrene. Representative of various diene are, for example, isoprene and butadiene. Representative of various elastomers are, for example, cis 1,4-polyisoprene (natural and synthetic), cis 1,4-polybutadiene, styrene/butadiene copolymers both emulsion and organic solution polymerization prepared copolymers, isoprene/butadiene copolymers, 3,4-polyisoprene, medium vinyl polybutadiene containing about 30 to about 80 percent vinyl content and styrene/isoprene/butadiene terpolymers.

The tire is then constructed by building a co-extruded tread stock onto a rubber tire carcass. Such construction is well known to those having skill in such art.

Tire assembly is vulcanized in a suitable mold under conditions of elevated temperature, for example, in a range of about 140° C. to about 180° C.

The co-vulcanized, carbon fiber reinforced, rubber tread and/or outer rubber layer over the outer surface of the tread is intended to provide a path of relatively low electrical resistance and, thus, a path for dissipation of static electricity between the ground, or outer surface of the tread intended to be ground-contacting and the tire bead portion and thence the metal rim of the vehicular wheel on which the tire is mounted.

After the tire tread, in service, becomes worn so that the rubber tread outer cap is worn away from the outer surface of the lugs of a tire tread having a lug and groove configuration, the path for dissipation of static electricity is maintained by the outer tread cap layer on the walls of the grooves of a tread of a lug/groove configuration.

By the terms "carbon black" reinforced for the tire carcass components, it is meant that the rubber contains a quantitative amount of carbon black reinforcement, such as for example, at least 25 and preferably at least about 35, phr of carbon black and a minimal amount of silica, if silica is present, and the weight ratio of carbon black to silica, if silica is present, is at least 5/1 and usually at least 10/1.

As the tire, having been mounted and inflated on a suitable electrically conductive rigid metal rim, itself mounted on a wheel of a vehicle, rolls across the ground, a path for electrical dissipation, is created between the rim to the tread, and thereby the ground, by the aforesaid electrically conductive top cap layer as it contacts at least one other carbon black reinforced rubber component of the tire.

In practice, the commonly employed siliceous pigments used in rubber compounding applications are preferably precipitated siliceous pigments (referred to herein as silica).

The siliceous pigments preferably employed in this invention are precipitated silicas such as, for example, those obtained by the acidification of a soluble silicate, e.g., sodium silicate.

The siliceous pigment (silica) should, for example, have an ultimate particle size in a range of 50 to 10,000 angstroms, preferably between 50 and 400 angstroms. The BET surface area of the pigment, as measured using nitrogen gas, is preferably in the range of about 50 to about 300, preferably about 120 to about 200, square meters per gram. The BET method of measuring surface area is described in the *Journal of the American Chemical Society*, Volume 60, page 304 (1930).

The silica also typically has a dibutylphthalate (DBP) absorption value in a range of about 100 to about 400, and usually about 150 to about 300.

The silica might be expected to have an average ultimate particle size, for example, in a range of about 0.01 to 0.05 micron as determined by the electron microscope, although the silica particles may be even smaller in size.

Various commercially available silicas may be considered for use in this invention such as, for example, only and without limitation, silicas commercially available from PPG Industries under the Hi-Sil trademark with designations 210, 243, etc; silicas available from Rhone-Poulenc, with designation of Zeosil 1165MP and silicas available from Degussa AG with designations such as, for example, VN2, VN3, and BV3370 and from J. M. Huber as Zeopol 8745.

When quantitative silica reinforcement is desired for a rubber tire tread, particulate, precipitated silica is conventionally used with a coupling agent, or what is sometimes referred to as a reinforcing agent.

Compounds capable of reacting with both the silica surface and the rubber elastomer molecule, in a manner to cause the silica to have a reinforcing effect on the rubber, many of which are generally known to those skilled in such art as coupling agents, or couplers, are often used. Such coupling agents, for example, may be premixed or pre-reacted with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself.

Numerous coupling agents are taught for use in combining silica and rubber, such as for example, silane coupling agents containing a polysulfide component, or structure, such as bis-(3-triethoxysilylpropyl)tetrasulfide.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black for this invention, if used, are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344-346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. Retarders are also used to control the rate of vulcanization. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent.

The presence and relative amounts of the above additives are not considered to be an aspect of the present invention which is more primarily directed to a tire with a quantitatively silica reinforced tread which (i) contains a minimal amount of reinforcement in the form of carbon fibers or (ii) contains a minimal amount of carbon black and said tread has an outer layer over at least a portion of its outer surface containing silica and/or carbon black reinforcement and carbon fibers intended to provide a path of relatively low electrical resistance from the outer surface of the tread to the bead portion of the tread.

The tire can be built, shaped, molded and cured by various methods which will be readily apparent to those having skill in such art.

The invention may be better understood by reference to the following examples in which the parts and percentages are by weight unless otherwise indicated.

EXAMPLE I

Pneumatic rubber tires, identified herein as Tires A and B, may be a P225/60R16 size. The tires would have the same carbon black reinforced rubber carcasses with associated beads and sidewalls. The treads would have the same surface configuration of lugs and grooves, with the grooves communicating with the tires' sidewalls in the shoulder region.

The tire identified herein as Tire B would have a rubber tread containing quantitative silica reinforcement and a minor amount of carbon black reinforcement exclusive of carbon fiber reinforcement and an outer rubber layer which is reinforced with silica and/or carbon black and carbon fibers.

The compositions for the respective tire treads, are to be comprised of materials shown in the following Table 1.

The aforesaid extruded treads would be suitably built onto the tire carcasses and the assembly thereof may be vulcanized in a tire mold at a temperature of about 160° C. for about 15 minutes to form cured pneumatic tires with tread configurations of lugs and grooves.

TABLE 1

(Tread)

| Tires A and B | Parts | |
|---|---|---|
| | Tire A | Tire B |
| Non-Productive Mix Stages | | |
| E-SBR[1] | 25 | 25 |
| Isoprene/Butadiene[2] Rubber | 45 | 45 |
| BR[3] | 20 | 20 |
| Natural Rubber[4] | 10 | 10 |
| Processing Aids[5] | 49 | 49 |
| Fatty Acid | 2 | 2 |
| Silica[7] | 80 | 80 |
| Carbon Black, Variable | 15 | 20 |
| Coupling Agent[8] | 12 | 12 |
| Carbon Fiber[9] | 10 | 0 |
| Productive Mix Stage | | |
| Sulfur | 1 | 1 |
| Zinc Oxide | 4 | 4 |
| Antioxidant(s)[6] | 3 | 3 |
| Sulfenamide and Thiuram Type Accelerators | 4 | 4 |

[1]Emulsion polymerization prepared SBR obtainable from The Goodyear Tire & Rubber Company having styrene contents of about 23 percent.
[2]An elastomer containing 50 percent isoprene obtained from The Goodyear Tire & Rubber Company.
[3]Cis 1,4-polybutadiene rubber obtainable as Budene® 1254 from The Goodyear Tire & Rubber Company.
[4]Natural rubber (cis 1,4-polyisoprene).
[5]Rubber processing oil as being about 26.5 parts in the E-SBR and about 5 parts in the PBd, where the amounts of E-SBR and PBd are reported above on a dry weight (without the oil) and in addition, about 17 parts additional rubber processing oil, plasticizers, resins and waxes were added.
[6]Of the di-aryl paraphenylene diamine and dihydro-trimethyl quinoline type.
[7]A silica obtainable as Zeosil 1165MP from the Rhone-Poulenc company.
[8]Obtainable as bis-3-(triethoxysilylpropyl) tetrasulfide (50% active) commercially available as X50S from Degussa as a 50/50 blend of the tetrasulfide with N330 carbon black (thus, considered 50% active).
[9]For tire A, 10 phr of carbon fibers may be used such as, for example, Fortafil 3(C) which is understood to be a trademark of the Akzo Company and, for Tire B, carbon black may be used of the N220 type.

TABLE 2

(Outer Rubber Layer) For Tire B

| | Parts |
|---|---|
| Non-Productive Mix Stages | |
| E-SBR[1] | 90 |
| Natural Rubber[2] | 10 |
| Processing Aids[3] | 40 |
| Fatty Acid | 10 |
| Carbon Black, N220 | 10 |
| Silica[4] | 45 |
| Carbon Fiber[5] | 15 |
| Productive Mix Stage | |
| Sulfur | 1 |
| Zinc Oxide | 4 |
| Antioxidant(s) | 3 |
| Sulfenamide and Thiuram Type Accelerators | 4 |

[1] Emulsion polymerization prepared SBR obtainable from The Goodyear Tire & Rubber Company having styrene content about 23 percent.
[2] Natural rubber (cis 1,4-polyisoprene).
[3] Rubber processing oil as being about 26.5 parts in the E-SBR and about 5 parts in the PBd, where the amounts of E-SBR and PBd are reported above on a dry weight (without the oil) and in addition, about 17 parts additional rubber processing oil, plasticizers, resins and waxes were added.
[4] Silica such as Zeosil 1165MP from the Rhone-Poulenc Company.

It is considered herein that, for a tire tread containing quantitative silica reinforcement and a minor amount of carbon black reinforcement of less than 15 phr, the use of carbon fibers for such carbon black reinforcement, for Tire A, in the tread composition would aid and/or supplement the carbon black reinforcement in lowering the electrical resistivity of the tires between the outer tread surface intended to be ground contacting and the bead portion of the tire.

It is considered herein that, for a tire tread containing quantitative silica reinforcement and a minor amount of carbon black reinforcement of less than 15 phr, the use of an outer co-vulcanized rubber layer, for Tire B, with particulate reinforcement for the rubber layer composed of a combination of carbon black and carbon fibers would aid and/or supplement the carbon black reinforcement in lowering the electrical resistivity of the tires between the outer tread surface of the tire intended to be ground-contacting and the bead portion of the tire.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having at least one carbon black reinforced component and also having a tread which is comprised of at least one sulfur vulcanizable elastomer selected from conjugated diene homopolymers and copolymers and copolymers of conjugated diene and vinyl aromatic compound and reinforced with silica and carbon black reinforcement, wherein said reinforcement in said tread consists of about 35 to about 95 phr of silica and about 5 to about 20 phr of carbon black and wherein a thin outer rubber layer is positioned over at least a portion of the outer surface of the tread intended to be ground-contacting and extends to contact the said at least one carbon black reinforced component and wherein said thin outer rubber layer contains about 40 to about 90 phr of reinforcement composed of about 25 to about 85 phr of silica, about 5 to about 15 phr of carbon fibers and up to about 30 phr of carbon black.

* * * * *